United States Patent [19]
Lee et al.

[11] Patent Number: 5,868,549
[45] Date of Patent: Feb. 9, 1999

[54] PALLETIZER WITH AIR ASSISTED SLIDE PLATE ASSEMBLY AND INDEXING PALLET HOIST

[75] Inventors: M. Horace Lee, Wetumpka; Phillip W. Edwards, Montgomery; Paul A. Davis, Elmore, all of Ala.; John J. Wilkins, Cincinnati, Ohio

[73] Assignee: HK Systems, Inc., New Berlin, Wis.

[21] Appl. No.: 920,575

[22] Filed: Aug. 29, 1997

[51] Int. Cl.$^6$ .................................................. B65G 57/24
[52] U.S. Cl. .................. 414/791.6; 414/676; 414/793.4; 414/903
[58] Field of Search ............................... 414/676, 791.6, 414/792.6, 902, 903, 907, 927

[56] References Cited

U.S. PATENT DOCUMENTS

| | | | |
|---|---|---|---|
| 3,300,065 | 1/1967 | Witmer | 414/903 |
| 3,975,057 | 8/1976 | Hurd | 414/676 |
| 4,024,965 | 5/1977 | Marth et al. | 414/907 |
| 4,030,618 | 6/1977 | Kelley et al. | 414/903 |
| 4,271,755 | 6/1981 | Kintgen et al. | 414/907 |
| 4,536,119 | 8/1985 | Miaskoff | 414/907 |
| 4,708,564 | 11/1987 | Mylrea et al. | 414/903 |
| 5,051,058 | 9/1991 | Roth | 414/903 |

OTHER PUBLICATIONS

Meridian Corporation drawing No. 02–1059–4, *Slide Plate*, Nov. 21, 1978.
Meredian Corporation drawing No. 02–2149–4, *Plenum Assembly*, Feb. 8, 1982.
Merdian Corporation drawing No. 02–1075–4, *Air Float Slide Plate*, Mar. 25, 1982.
Litton UHS drawing No. 830821, *Preliminary Dimensional Layout Daubois Incorporated*, Aug. 25, 1983.
Western Atlas specification sheet, *Von Gal Palletizers*, Model VGHS4000 High Speed Palletizer.

*Primary Examiner*—Karen M. Young
*Assistant Examiner*—Gregory A. Morse
*Attorney, Agent, or Firm*—Nilles & Nilles S.C.

[57] ABSTRACT

A palletizer has an improved slide plate assembly and an improved indexing hoist. The slide plate assembly incorporates measures to reduce friction between it and the bags or other articles being handled by it. The orientation of the slide plates of the assembly are altered ninety degrees with respect to traditional slide plate orientation to eliminate the deadplate encountered by articles sliding along the slide plates. An air assist mechanism also is incorporated into the slide plate assembly to produce an air cushion between the articles and the top surface of the slide plates. The hoist, which is designed to index upwardly after receiving a layer of articles to compress that layer against the bottom surface of the slide plate assembly to flatten the articles and to force air out of them, incorporates an improved controller that causes the hoist to assuredly impart the desired compressive force to the articles without over-compressing the articles or overloading the hoist's lift motor.

21 Claims, 14 Drawing Sheets

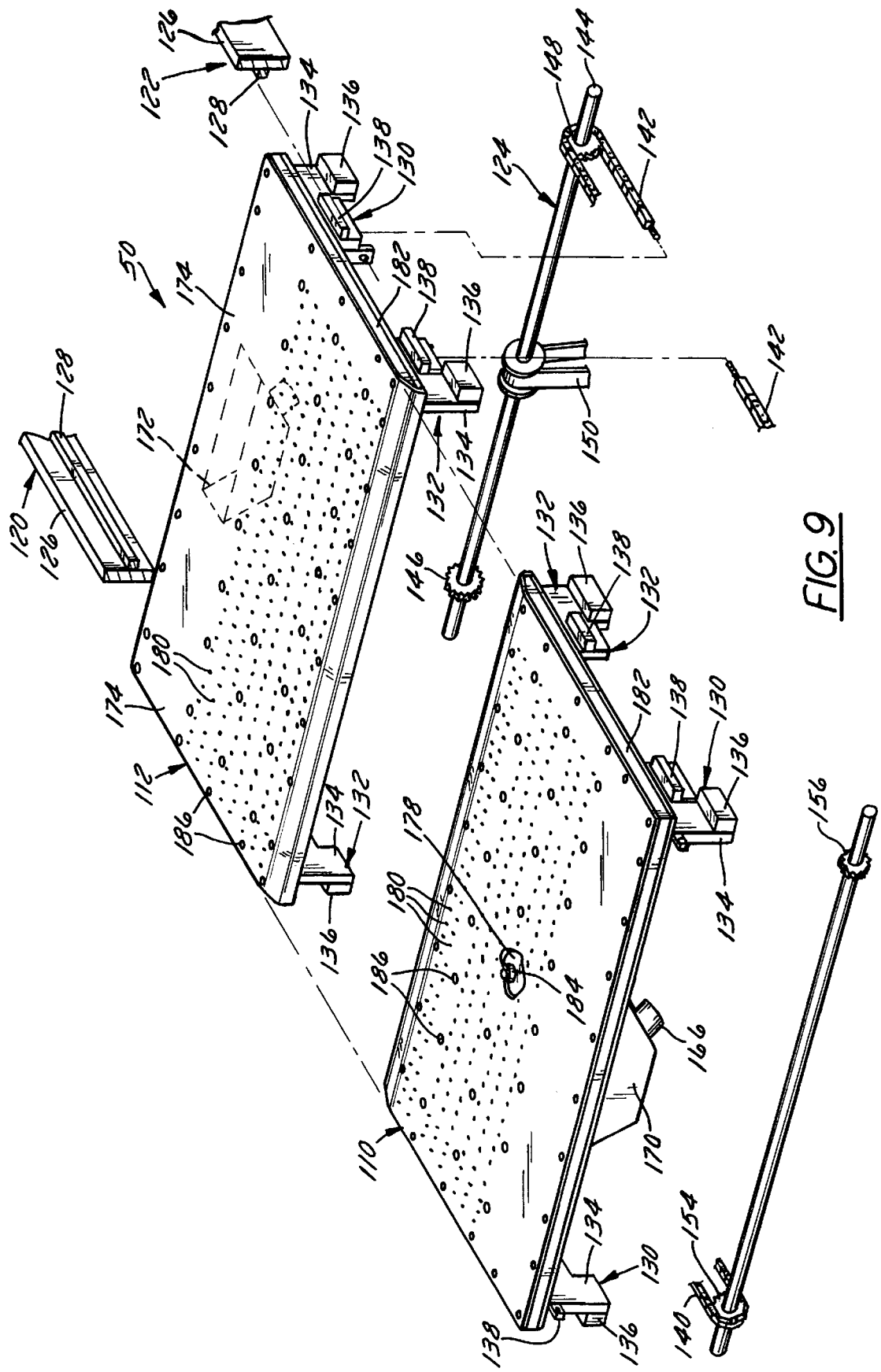

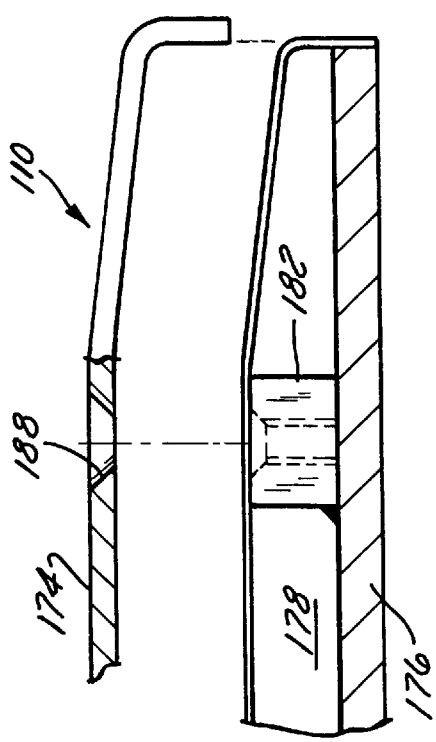
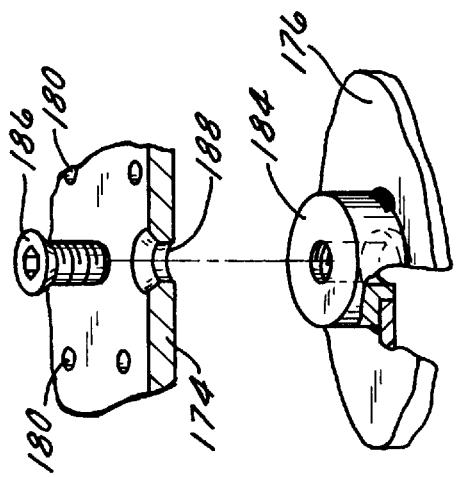
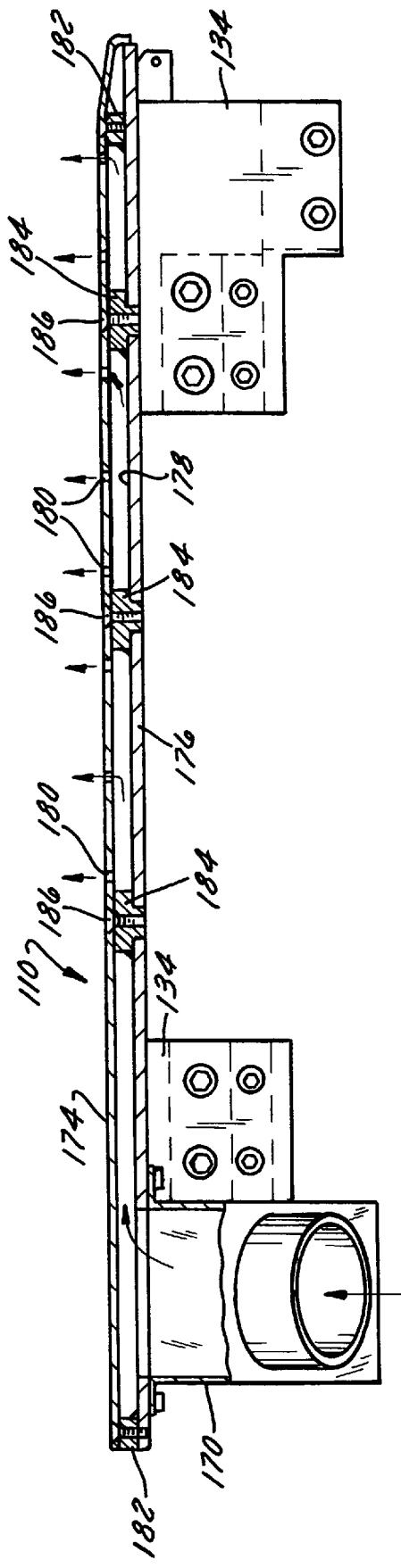
FIG. 11
FIG. 12
FIG. 10 ns/A0-3-0,549-1-2 #,868,549

PALLETIZER WITH AIR ASSISTED SLIDE PLATE ASSEMBLY AND INDEXING PALLET HOIST

BACKGROUND OF THE INVENTION

1. Field of the Invention

The invention relates to palletizers and, more specifically, relates to a palletizer having an improved slide plate assembly and an indexing pallet hoist. The invention additionally relates to an improved method of indexing a pallet hoist of a palletizer.

2. Background of the Invention

Palletizers are well known for automatically or semi-automatically stacking layers of articles such as bags or cartons on a pallet, sheet, or other support. The typical palletizer includes two vertically-spaced conveyor assemblies which convey articles and supports, respectively.

The upper conveyer assembly typically includes a slide plate assembly (sometimes known as a stripper plate assembly) onto which articles are conveyed in a pattern suitable for depositing as a layer onto a stack. The upper conveyor assembly may also include an upstream slat sorter, a turner assembly, and an accumulator conveyor assembly that interact to arrange the conveyed articles into the desired pattern. The layer is typically transferred from the accumulator conveyor assembly to the slide plate assembly by a rake assembly or the like.

The lower conveyor assembly includes a vertically-movable hoist (sometimes known as an indexing pallet hoist) that is positioned beneath the slide plate assembly, that is raiseable to receive layers of articles one at a time from the slide plate assembly to form a stack, and that indexes downwardly to receive each successive layer. The lower conveyor assembly also may include an outfeed conveyor for conveying a completed stack of articles away from the hoist as well as a staging mechanism and other equipment for conveying a stack of pallets, sheets, or other supports toward the hoist and for delivering the supports one at a time to the hoist.

The slide plates of the typical palletizer deposit a layer of articles onto the underlying hoist by initially supporting the layer on one or more imperforate metal plates and by driving the plate(s) to slide out from under the layer to deposit the layer onto the underlying stack. Some employ a single slide plate moving away from the outfeed end of the rake assembly. Others employ two facing plates that move away from one another to define so-called "bi-parting stripper plates." A palletizer employing a slide plate assembly of this type is manufactured by HK Systems, Inc. under the name von Gal as Model No. VGHS4000.

Traditional slide plate assemblies employing imperforate longitudinally moving slide plates exhibit drawbacks when handling relatively high-friction articles such as plastic bags. The articles tend to stick to the metal plates, particularly during warm weather, and bunch and roll up so that they do not form an even layer of uniform dimensions. The imperfectly-formed layer is poorly suited for stacking on previously-formed layers and also is poorly suited for forming a base for subsequent layers. The problem of sticking and rolling is exacerbated by two features of the traditional slide plate assembly design.

First, the imperforate metal surface of the slide plate has a relatively high frictional coefficient. Contact between the bag or other article and the slide plate hinders smooth sliding motion of the article across the plate. The article also tends to stick to the moving plate during a stripping or depositing operation.

Second, the aligned orientation of the slide plate(s) relative to the direction of conveyance of the upper conveyor assembly requires relatively lengthy movement between the slide plate(s) and the articles both during movement of articles onto the slide plate assembly and during stripping motion of the slide plates. This lengthy movement results from the fact that the conveyed articles and the stripper plate(s) move in the same direction so that the articles must travel a substantial distance before reaching their final position above the hoist. The plate area that must be traversed by a layer of articles prior to its final positioning is commonly known in the art as "deadplate." Minimizing deadplate would minimize the area of frictional contact between the layer of articles and the slide plate(s).

Another problem associated with the traditional palletizer resides in the operation of its indexing pallet hoist. In some applications, and particularly in the palletizing of bags or other articles which may become partially filled with air or otherwise may not be as flat as otherwise would be desired for stacking, the hoist is used to compress each layer of articles against the bottom surface of the slide plate assembly to force the air out of the articles and to flatten them. That is, after a layer of articles is deposited onto the hoist (or on another layer of articles if another layer of articles has been previously deposited), the hoist is lowered or indexed downwardly to provide clearance for the slide plates, the slide plates are closed, and then the hoist is raised or indexed upwardly to force the upper surface of the upper layer of articles into compressive engagement with the bottom surface of the slide plates. The hoist is then lowered again or indexed downwardly to receive another layer.

Hoist raising and lowering is typically achieved using a variable-speed electric motor. The amount of torque imposed by the motor must be controlled in order to impose the desired compressive force on the upper layer of articles. Traditional palletizers control motor torque using a current sensing relay that cuts off power supply to the electric motor upon sensing a rise in current occurring due to article engagement with the bottom surface of the slide plate assembly. A disadvantage of this approach is that the motor is necessarily overloaded during each compressing operation. Premature wear and failure of the motor and other components and/or article bursting may result. Moreover, it is very hard to control or set the motor of traditional systems for different article properties.

OBJECTS AND SUMMARY OF THE INVENTION

A first object of the invention therefore is to provide an article-handling system that includes a slide plate assembly exhibiting relatively low friction between the slide plates of the assembly and the articles being handled.

Preferably, friction is reduced by reducing the deadplate over which the articles must travel prior to and/or during a stripping operation. More specifically, the slide plate assembly includes first and second slide plates which are positioned adjacent the discharge end of the article conveyor assembly. The slide plates face one another and move laterally with respect to a direction of conveyance of the associated article conveyor assembly (1) from a first position in which the slide plates are located closely adjacent to each other so as to be capable of supporting a layer of articles (2) to a second position in which the slide plates are spaced from one another to form an opening through which the layer of articles may drop.

Friction in a slide plate assembly may also be reduced by using an air assist assembly to form an air cushion between the articles and the slide plates. Specifically, each of the slide plates preferably comprises a top plate having perforations formed therethrough and a bottom plate disposed beneath the top plate to define a chamber therebetween. A blower and one or more hoses supply air to the chambers of the slide plates whereby air flows upwardly through the perforations in the top plates to form an air cushion that reduces friction between the layer of articles and the slide plates.

Another object of the invention is to provide a hoist assembly for a palletizer or other article-handling system that incorporates measures to effect more precisely-controlled compression of the upper layer of articles so as to assuredly achieve the desired compression without bursting or otherwise damaging the articles and without overloading the hoist's drive motor.

In accordance with another aspect of the invention, this object is achieved by providing a stationary hoist frame, a support bed mounted on the hoist frame for vertical movement thereon, a drive assembly, and an indexing mechanism. The drive assembly drives the support bed to move vertically upwardly between (1) an article receiving position in which the support bed receives layers of articles from the slide plate assembly and (2) a compressing position in which an upper layer of articles on the support bed is compressed against a bottom surface of the slide plate assembly to flatten the upper layer of articles. The indexing mechanism controls the drive assembly to impose a designated torque on the support bed when the support bed is raised from the article receiving position to the compressing position. The designated torque increases stepwise with the number of layers of articles supported on the support bed so that a uniform compressive force is imposed on each layer of articles by the bottom surface of the slide plate assembly.

Preferably, the drive assembly comprises an electric motor and the indexing mechanism comprises a motor controller which supplies electrical power to the electric motor. The motor controller includes means for counting a number of layers of articles supported on the support bed and means, coupled to the means for counting, for determining an optimal amount of torque required to be generated by the motor to impose the uniform compressive force. The means for determining multiplies a signal indicative of a torque multiplier by a counted number of layers of articles and adds the results to a signal indicative of a reference torque. Means, coupled to the means for determining and to the motor, causes the motor to generate the optimal amount of torque.

Still another object of the invention is to provide an improved method of indexing a hoist relative to an overlying slide plate assembly.

In accordance with another aspect of the invention, this object is achieved by positioning a support surface of a hoist beneath a slide plate assembly, then opening the slide plate assembly to deposit a layer of articles on the support surface, then closing the slide plate assembly, and then raising the hoist to a compressing position in which the layer of articles engages and is compressed against a bottom surface of the slide plate assembly with a designated compressive force. The raising step comprises generating a designated torque using a drive assembly for the hoist. The magnitude of the designated torque is determined following the depositing step and before the end of the raising step.

Preferably, the step of generating a predesignated torque comprises supplying a current to an electric motor of the drive assembly from a drive controller. The designated torque is calculated by 1) counting the number of layers of articles on the hoist, 2) multiplying the counted number of layers by a fixed torque multiplier to obtain an indexing torque, and 3) adding the indexing torque to a reference torque to obtain the designated torque.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 6 and 7 schematically illustrate article patterns formed by the upper conveyor assembly and deposited onto the hoist as layers;

FIG. 9 is a partially-exploded, partially-cut away perspective view of the slide plate assembly of the palletizer of FIGS. 1 through 3;

FIG. 10 is a sectional, partially-cut away end elevation view of one of the slide plates of the slide plate assembly of FIG. 9;

FIG. 11 is a partially-exploded sectional end elevation view of a portion of the slide plate illustrated in FIG. 10;

FIG. 12 is an exploded perspective view of a portion of the slide plate of FIGS. 10 and 11;

DETAILED DESCRIPTION OF THE PREFERRED EMBODIMENTS

1. Resume

Figure 1:
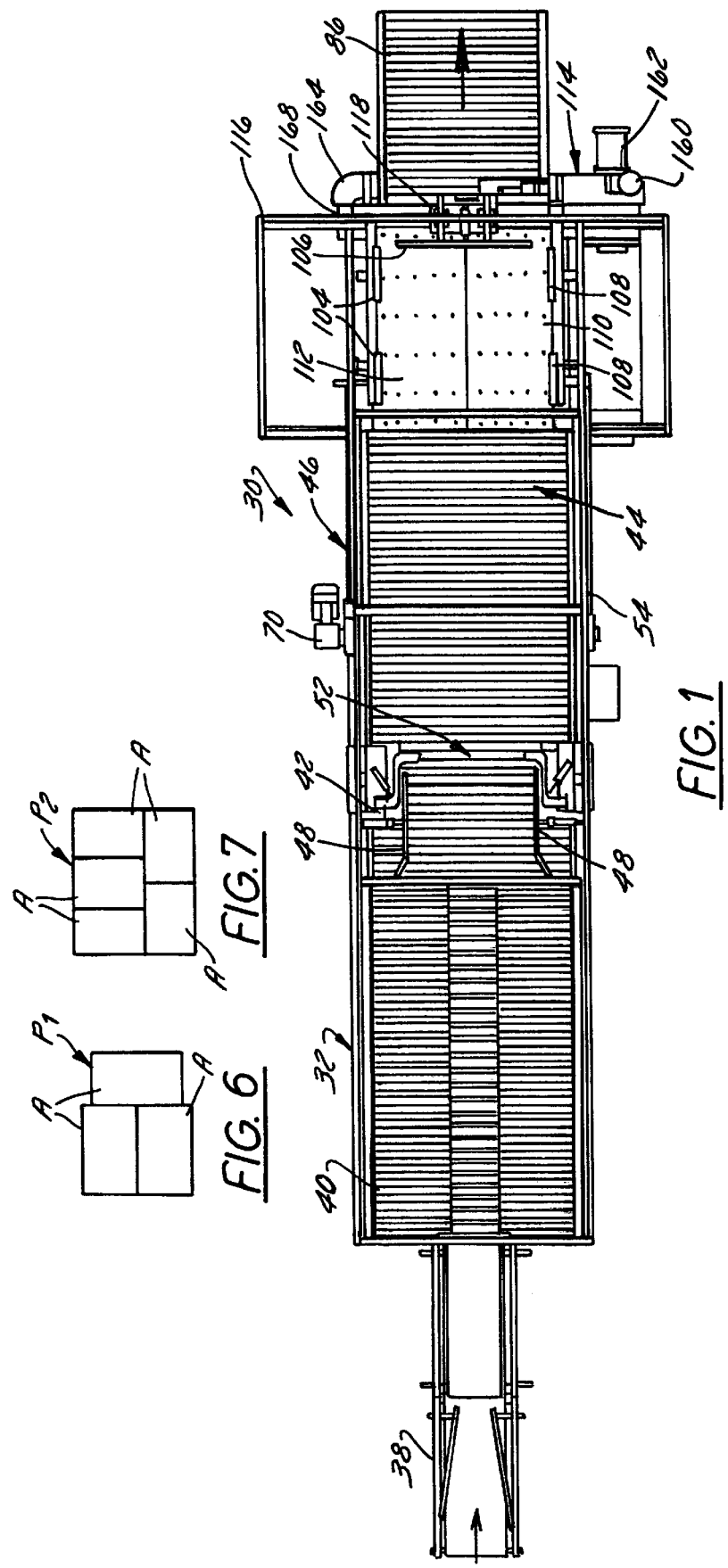
FIG. 1 is a top plan view of a palletizer incorporating a slide plate assembly and indexing hoist constructed in accordance with the present invention.

Pursuant to the invention, a palletizer is provided having an improved slide plate assembly and an improved indexing hoist. The slide plate assembly incorporates measures to reduce friction between it and the bags or other articles being handled by it. The orientation of the slide plates of the assembly are altered ninety degrees with respect to traditional slide plate orientation to eliminate the deadplate encountered by articles sliding along the slide plates. An air assist mechanism also is incorporated into the slide plate assembly to produce an air cushion between the articles and the top surface of the slide plates. The hoist, which is designed to index upwardly after receiving a layer of articles to compress that layer against the bottom surface of the slide plate assembly to flatten the articles and to force air out of them, incorporates an improved controller that causes the hoist to assuredly impart the desired compressive force to the articles without over-compressing the articles or overloading the hoist's lift motor.

2. System Overview

Referring now to the drawings and initially to FIGS. 1 through 4 in particular, a palletizer assembly 30 is illustrated that includes an upper conveyor assembly 32 for conveying articles and a lower conveyor assembly 34 for conveying article supports. Both conveyor assemblies 32 and 34 are mounted on a common frame 36 formed from a plurality of interconnected metal braces.

The palletizer 30 of the illustrated embodiment is designed to handle bags that store pet food or the like and to stack these bags on cardboard sheets. Hence, the illustrated upper conveyor assembly 32 constitutes a bag handling system, and the illustrated lower conveyor assembly 34 constitutes a sheet handling system. It should be understood, however, that the invention is equally applicable to systems for handling cardboard boxes or other articles and for stacking these articles on wooden or plastic pallets.

The upper conveyor assembly 32 is designed to receive articles in a single line, to arrange them in a predesignated pattern suitable for forming layers of a stack, and to deposit these layers one at a time onto an indexing pallet hoist 84 of the underlying lower conveyor assembly 34 to form a stack. The upper conveyor assembly 32 includes an infeed conveyor 38, a slat sorter 40, a turner assembly 42, an accumulator conveyor assembly 44, a rake assembly 46, and a slide plate assembly 50.

All components of the upper conveyor assembly 32 except for the slide plate assembly 50 are conventional. Most components, therefore, are only briefly described.

The infeed conveyor 38 comprises a belt conveyor that receives articles A and that conveys them one at a time onto the downstream slat sorter 40 using converging guide plates 48 to help center the articles A on the slat sorter 40. The slat sorter 40 sorts the received articles into multiple lanes for pattern formation. The turner assembly 42 turns selected articles (while the articles are being conveyed towards the downstream accumulator conveyor assembly 44 by a roller conveyor assembly 52) to form a predesignated pattern on the accumulator conveyor assembly 44 such as the two/one pattern $P_1$ seen in FIG. 6 or the two/three pattern $P_2$ seen in FIG. 7. The turner assembly 42 and other components typically will be controlled so the successive patterns of articles fed to the accumulator conveyor assembly 44 alternatively take the configuration $P_1$ of FIG. 6 and the configuration $P_2$ of FIG. 7 so that, when these patterns are deposited as layers onto the underlying hoist 84 in a subsequent operation, the articles A of alternate layers will assume correspondingly different configurations to improve stacking.

Figure 4:
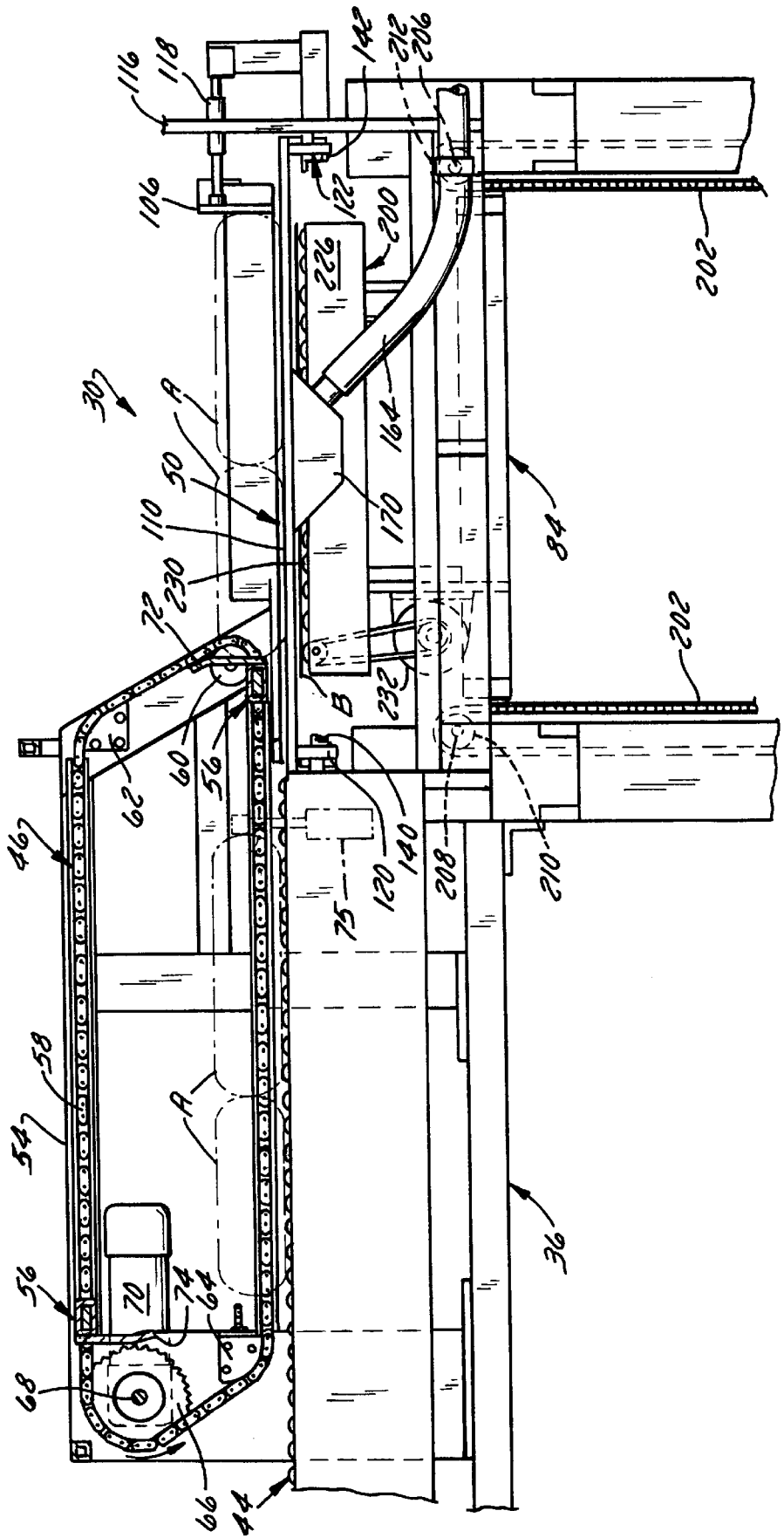
FIG. 4 is a side elevation view of a portion of the palletizer of FIGS. 1 through 3 and illustrating the raking of articles from the accumulator conveyor assembly of the palletizer and onto the slide plate assembly of the palletizer.
Figure 8:
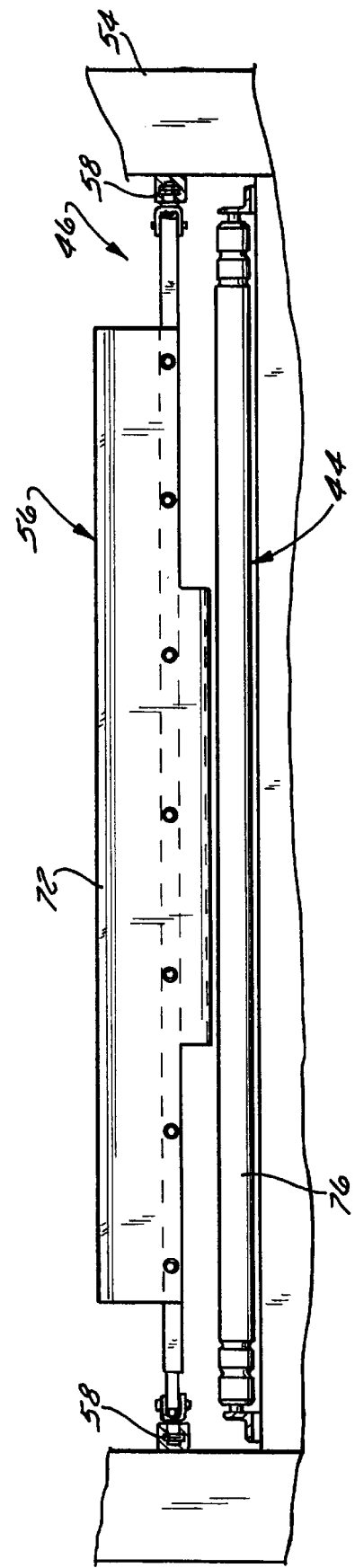
FIG. 8 is a sectional end elevation view of a portion of the palletizer of FIGS. 1 through 3 that includes a portion of the rake and accumulator conveyor assemblies.
Figure 13:
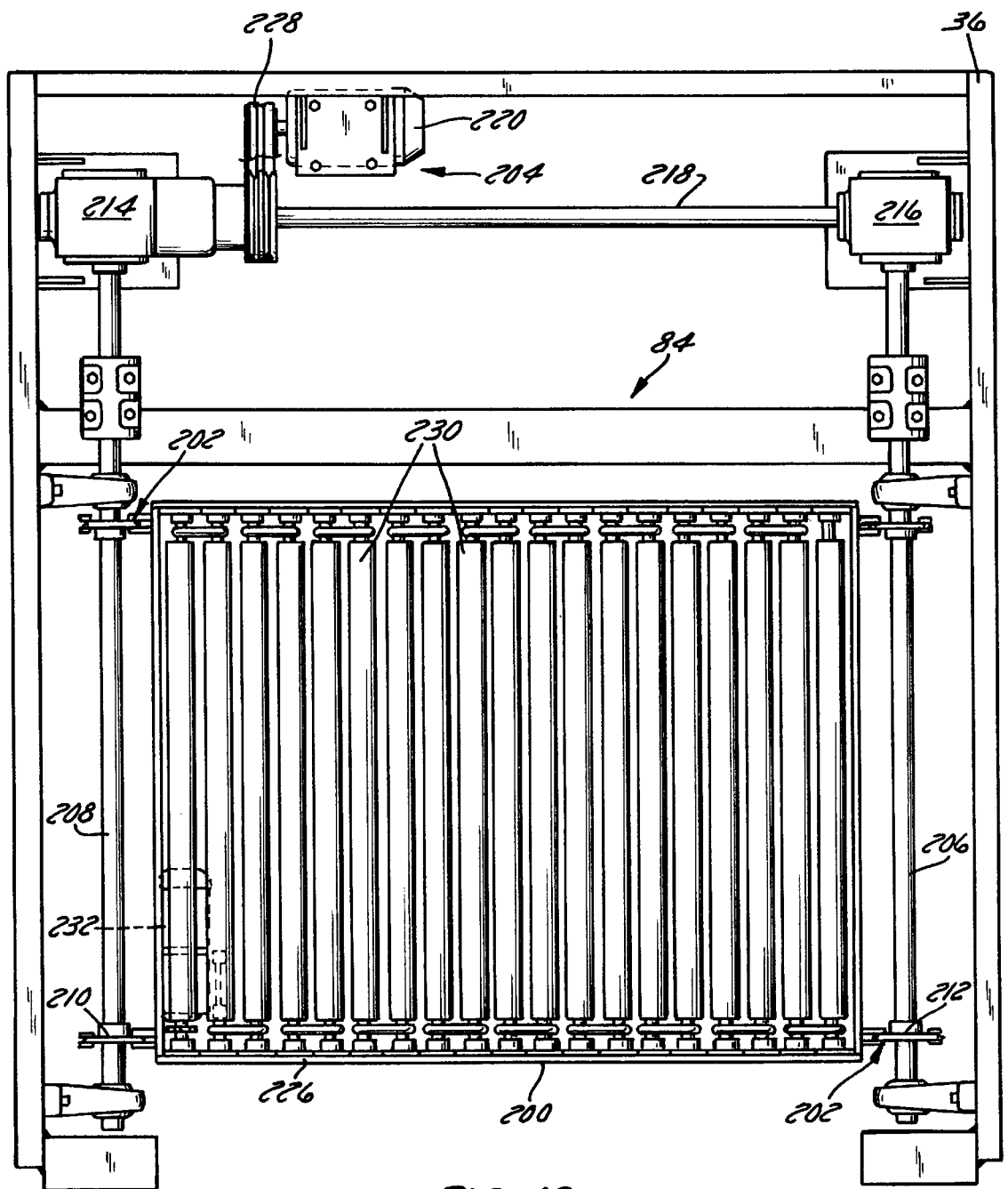
FIG. 13 is a top plan view of the indexing hoist of the palletizer of FIGS. 1 through 3.

The rake assembly 46, though not essential to the invention, will be described in some detail because it cooperates with the inventive slide plate assembly 50. Referring particularly to FIGS. 4 and 8, the rake assembly 46 includes 1) a support frame 54 mounted on the main frame 36 above the accumulator conveyor assembly 44 and 2) a rake mechanism 56 mounted on the support frame 54. The rake mechanism 56 includes a plurality (two in the illustrated embodiment) of raking flights 72 and 74 driven by a pair of laterally spaced, longitudinally extending drive chains 58. Each guide chain or drive chain 58 is supported on an idler sprocket 60 mounted on one end of the frame 54, a pair of intermediate guide blocks 62 and 64, UHMW chain guide tracks, and a drive sprocket 66 located at the other end of the frame 54. Both drive sprockets 66 are driven by a common drive shaft 68 that in turn is driven to rotate by an electric motor 70.

In use, a pattern of articles is accumulated on the accumulator conveyor assembly 44 beneath the rake mechanism 56 and arrested from further movement along the conveyor assembly 44 by a pneumatically operated, vertically reciprocating layer stop 75. The layer stop 75 is then retracted, and the motor 70 energized to drive the chains 58 counterclockwise as seen in FIG. 4 so that a raking flight 72 engages the pattern A of articles and pushes the pattern onto the slide plate assembly 50 to the position seen in FIG. 4. The raking flight 72 works in conjunction with pushers (detailed below) to center the layer A and to hold the layer A in position pending stripping operation of the slide plate assembly. Another pattern of articles can then be conveyed into position and arrested by the layer stop 75 as illustrated in phantom lines in FIG. 4.

The slide plate assembly 50 receives patterns of articles one at a time from the accumulator conveyor assembly 44 and the rake assembly 46 and deposits each pattern onto the underlying hoist 84 as a layer. The construction of the slide plate assembly 50, its operation, and its cooperation with other components of the palletizer is detailed in Section 3 (Construction and Operation of Slide Plate Assembly) below.

Figure 2:
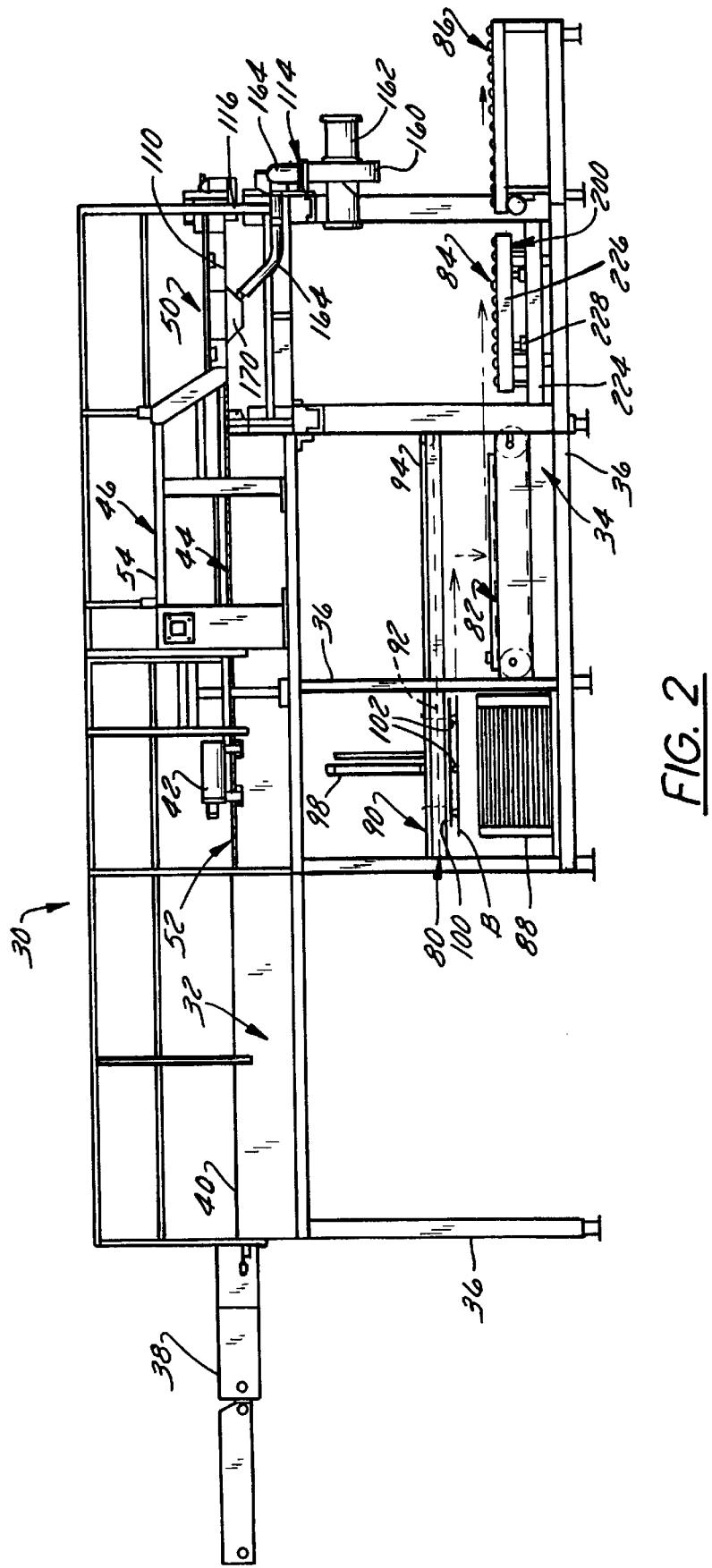
FIG. 2 is a side elevation view of the palletizer of FIG. 1.
Figure 3:
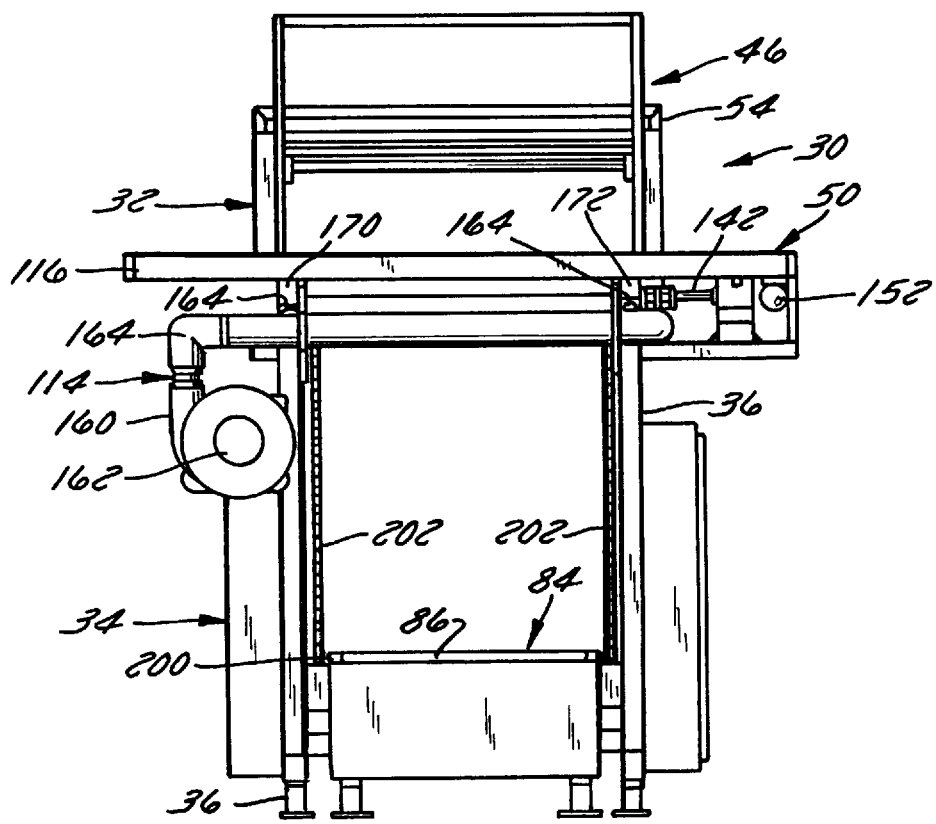
FIG. 3 is an end elevation view of the palletizer of FIGS. 1 and 2.

Referring primarily to FIG. 2, the lower conveyor assembly 34 includes, from upstream to downstream end, a sheet dispenser/conveyor assembly 80, a staging conveyor or infeed conveyor 82, the hoist 84, and a discharge or outfeed conveyor 86. All components of the lower conveyor assembly except for the hoist 84 are conventional. Most, therefore, are described only briefly.

The sheet dispenser/conveyor 80 includes 1) a mechanism 88 for supporting a plurality of stacked sheets and 2) a sheet conveyor apparatus 90 that overlies the mechanism 88. The sheet conveyor apparatus 90 includes a carriage 92 and a sheet transfer assembly mounted on the carriage 92. The carriage 92 is movable horizontally under power of an article transfer conveyor 94. The sheet transfer assembly includes a vertically extendable cylinder 98, a plate 100 mounted on the cylinder 98 to reciprocate vertically therewith, and a plurality of suction cups 102 that extend downwardly from the plate 100.

In operation, the cylinder 98 moves downwardly so that the suction cups 102 grip the top sheet B of the stack, then moves upwardly to provide sufficient clearance for further operation. The transfer conveyor 94 is then operated to drive the carriage 92 to the right as seen in FIG. 2, at which time the suction cups 102 are released (coupled with the simultaneous lowering of the cylinder 98) to deposit the sheet B on the infeed conveyor 82. The infeed conveyor 82 then conveys the sheet B onto the hoist 84. The hoist 84 then raises the sheet B upwardly and indexes to form a stack of articles as detailed in Section 4 (Construction and Operation of Indexing Hoist) below. Once the stack is fully formed, the hoist 84 is lowered to its lowermost position illustrated in FIG. 2. The stack of articles then is conveyed onto the outfeed conveyor 86 and out of the palletizer 30.

3. Construction and Operation of Slide Plate Assembly

Referring to FIGS. 1–10, the slide plate assembly 50 includes a layer compression and centering device 104–108; first and second bi-parting slide plates 110 and 112; and an air assist assembly 114, all of which are mounted on a frame 116 supported by the main frame 36 at a position located above the hoist 84.

The layer compression and centering device serves to prevent the constituent articles of a layer from becoming mis-oriented or misaligned as they are conveyed onto the slide plate assembly 50 so that the layer retains its desired pattern $P_1$ or $P_2$ by article centering and by fore-to-aft and side-to-side compression of the layer. Fore-to-aft compression of the layer is achieved by an end pusher 106 working in conjunction with a raking flight 72 or movable side-side compression is achieved by laterally movable side plates 105 and 107 which are selectively driven laterally to move pushers 104 and 108 towards one another. The pushers 104 and 108 are mounted on the side plates 105 and 107 and, in addition to moving with the side plates 105 and 107, also are movable independently of the side plates 105 and 107 to center individual portions of the article layer. Movement of each of the elements 104–108 is achieved by operation of a respective cylinder 118.

The slide plate assembly 50 preferably comprises a so-called "bi-parting stripper plate assembly" or "bi-parting slide plate assembly" having first and second slide plates 110 and 112 positioned adjacent the discharge end of the accumulator conveyor 44. The slide plates 110 and 112 face one another and are movable laterally with respect to a direction of article conveyance 1) from a first position (seen in FIG. 1) in which the slide plates 110 and 112 are located closely adjacent each other so as to be capable of supporting a pattern of articles A 2) to a second position (seen in FIG. 5) in which the slide plates 110 and 112 are spaced from each other to form an opening through which the pattern of articles A may drop as a layer onto the hoist 84. The slide plates 110 and 112 receive air from the air assist assembly 114 as detailed below so that air is directed upwardly from the slide plates 110 and 112 to form an air cushion that reduces friction between the articles and the slide plates 110 and 112.

The slide plates 110 and 112 are slidably mounted on a pair of longitudinally spaced, laterally extending rails 120 and 122. Each rail is generally T-shaped so as to have a vertical leg 126 and an inwardly extending horizontal support leg 128. Each slide plate 110 and 112 is supported on the rails 120 and 122 by four sets of supports that permit the slide plate 110 or 112 to move horizontally along the rails but that prevent either upward or downward movement of the slide plate relative to the rails. In the illustrated embodiment, two spaced sets 130 and 132 of supports are located at each side of each slide plate 110 and 112. Each support set includes a support bar 134 rigidly attached to the bottom plate 176 of the associated slide plate 110 or 112, at least one lower support, and at least one upper support. Each set 130 or 132 preferably includes a single lower support 136 and a single upper support 138 mounted on the support bar 134 so as to be offset from one another in the longitudinal direction of the rail 120 or 122. The supports preferably comprise lower slide blocks 136 formed from steel and upper slide blocks 138 formed from a low-friction material such as Nylatron plastic. Side guides 137 are also provided for preventing lateral or side-to-side motion of the slide plates 110 and 112 relative to the rails 120 and 122. The horizontal leg 128 of each rail 120 or 122 is trapped between these opposed blocks 136 and 138 to permit the slide plates 110 and 112 to move horizontally along the rail but to prevent vertical slide plate motion. The lower block 136 is not necessary during sliding operation of the slide plates 110 and 112 but is necessary during a compressing operation of the hoist 84 as detailed in Section 4 below.

The slide plates 110 and 112 are driven to move along the rails 120 and 122 by a drive assembly 124. The preferred drive assembly 124 effects simultaneous movement of both slide plates 110 and 112 so that they move uniformly toward or away from one another. In the illustrated embodiment, the drive assembly 124 includes a pair of spaced drive chains 140, 142 driven to rotate by a common drive shaft 144 and by respective drive sprockets 146, 148. The drive shaft 144 is driven to rotate by a timing belt 150 and a reversible electric motor 152. Each drive chain 140, 142 is attached to both slide plates 110 and 112 in a conventional manner and extends over an idler sprocket 154 or 156 located at the opposite end of the assembly 50 from the drive sprocket 146 or 148 (see FIG. 9) to complete a loop. Energization of the motor 152 in the forward direction drives the slide plates 110 and 112 toward one another at a uniform rate and through uniform distance, and energization of the motor 152 in the reverse direction drives the slide plates 110 and 112 away from one another at a uniform rate and through a uniform distance.

The air assist assembly 114 could comprise any device capable of supplying air to the slide plates 110 and 112 at a designated, preferably controllable rate. The illustrated and preferred air assist assembly (best seen in FIGS. 1–4) includes a blower arrangement and a ductwork arrangement that directs air from the blower arrangement to the slide plates. The blower arrangement preferably comprises a blower 160 powered by an electric motor 162 controlled by a vector drive (not shown) for variable speed control. The ductwork arrangement includes a six inch diameter outlet tube 164 that "T"s into two four inch diameter hoses 166 and 168. Each hose 166 or 168 is connected to a plenum 170 or 172 of one of the slide plates 110 or 112.

The first and second slide plates 110 and 112 are of essentially identical construction. Hence, only the first slide plate 110 will be described.

The first slide plate 110 includes a top plate 174 and a bottom plate 176 spaced from one another to form a chamber 178 therebetween that receives air from the air assist assembly 114. The top plate 174, which is formed from a relatively low-friction metal such as 11 gauge stainless steel, has a plurality of perforations 180 formed therein for the passage of air from the chamber 178. The bottom plate 176 is formed from ¼" steel or the like. The chamber 178 is enclosed by attaching a side plate arrangement 182 to the top and bottom plates 174 and 176 near the lateral and longitudinal peripheries thereof. A uniform spacing between the top plate 174 and the bottom plate 176 is maintained by a plurality of spacers 184. Each spacer 184 preferably comprises a stepped tapped tubular bushing. Each bushing is located in holes punched in the bottom plate 176, is welded to the bottom plate 176, and is connected to the top plate by a flat-headed screw 186. Screw 186 extends through a hole 188 in the top plate 176 and is threaded into the tapped bushing 184.

In use, the slide plate assembly 50 is positioned for receiving a pattern of articles A by driving the motor 152 in the forward direction to position the slide plates 110 and 112 as illustrated in FIG. 1 in which they are located closely adjacent to one another. The rake assembly 46 is actuated to rake a layer of articles onto the slide plates 110 and 112, and the pushers and side plates 104–108 are actuated to center and compress the layer of articles. Rolling or bunching of articles is minimized or prevented in two ways. First, because the slide plates 110 and 112 move laterally with respect to the direction of article conveyance and are located closely adjacent the rake assembly, the distance or deadplate that the layer of articles must slide along before reaching the slide plate assembly is eliminated with a resulting decrease in sliding contact. Second, as best seen in FIG. 10, air flow through the plenums 170 and 172, into the chambers 178, and out of the perforation 180 or orifices forms an air cushion that additionally reduces friction between the articles A and the slide plates 110 and 112. Hence, the desired orientation of the articles is retained.

Figure 5:
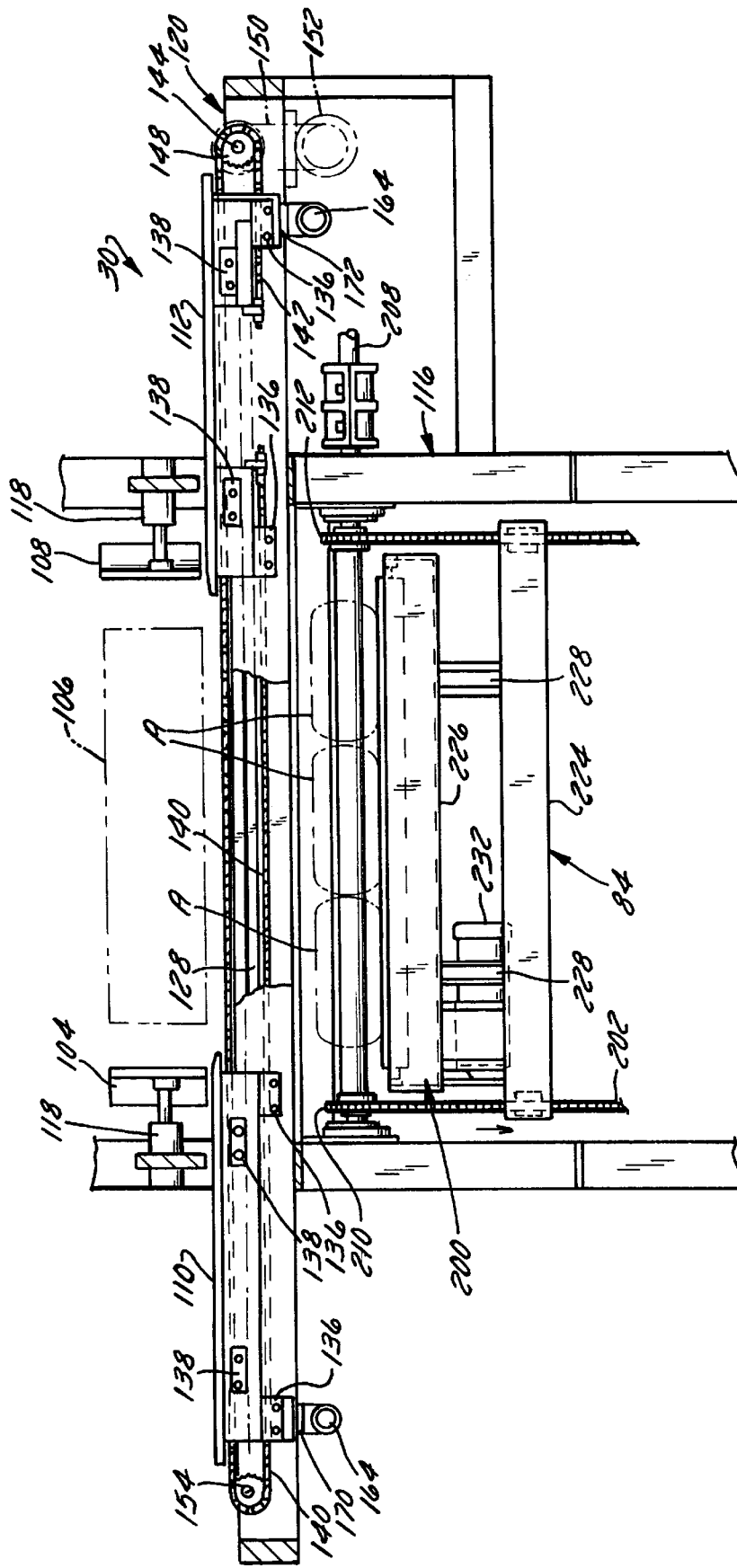
FIG. 5 is an end elevation view of the portion of the palletizer illustrated in FIG. 4 and illustrating the depositing of a layer of articles onto the hoist from the slide plate assembly.

Next, when it is desired to deposit the pattern of articles onto the hoist 84 as a layer, the motor 152 is reversed to drive the slide plates 110 and 112 away from one another, thereby stripping the layer of articles and causing it to drop onto the hoist 84 (or onto another layer of articles if another layer is present) as seen in FIG. 5. Once again, frictional contact between the articles A and the slide plates 110 and 112 is minimized due to the lateral motion of the slide plates 110 and 112 and due to the air cushion provided by the air assist assembly 114.

Figure 21:
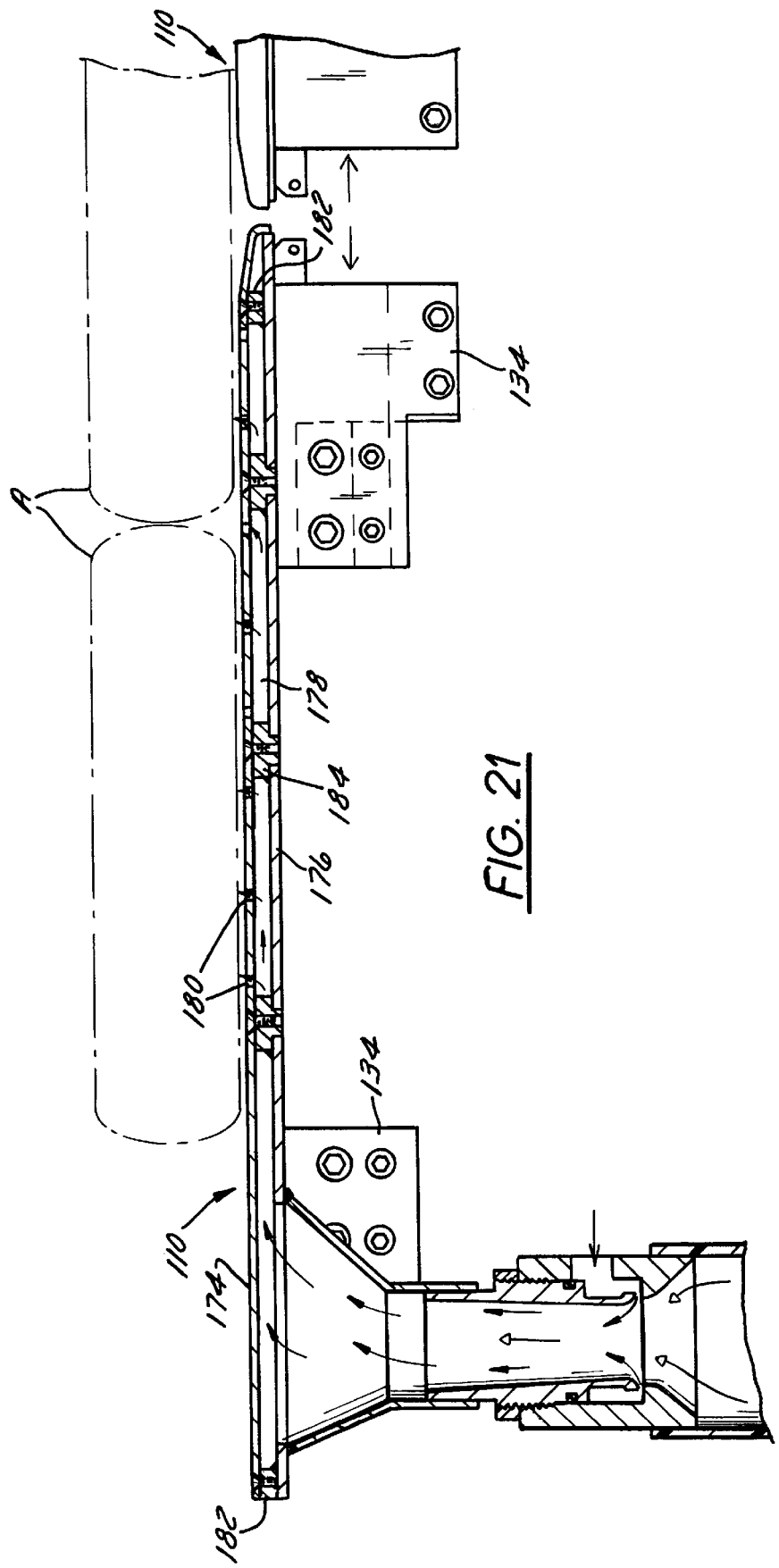
FIG. 21 is a sectional, partially-cut away end elevation view of a portion of a slide plate assembly constructed in accordance with another embodiment of the invention.

A more precisely-controlled alternative to the above-described operation is to cyclically cut off or at least reduce the supply of air to the slide plates 110 and 112 to permit increasing friction to act as a brake so that the incoming articles A do not bunch up against the pusher 106 at the downstream end of the slide plate assembly 50. For instance, referring to FIG. 21, the blower arrangement 160, 162 could be replaced by a pair of conventional air amplifiers 260 (only one of which is shown), each of which supplies air to a respective slide plate 110, 112 from a source of compressed air (not shown). The supply of the compressed air to the air amplifiers 260 could be terminated by a suitable shut-off valve (not shown) when the articles A are sliding onto the slide plates 110 and 112 so that airflow through the plates 174 diminishes as the articles approach the pusher 106 and ceases altogether by the time that the articles A reach the pusher 106. Shut-off valve operation could be triggered by operation of the rake mechanism 56 such that the valve opens upon or just prior to the supply of motive power to the chains 68 and closes under control of a limit switch or the like when the operative raking flight 72 or 74 approaches the terminal position as illustrated by the position of the raking flight 72 seen in FIG. 4.

A similar braking effect could be achieved with the design of the first embodiment if a suitable damper arrangement were to be incorporated into the ductwork downstream of the blower arrangement 160, 162 and controlled in sequence with the rake mechanism 56.

4. Construction and Operation of Indexing Hoist

The hoist 84 is designed to help convey a sheet B onto a support bed thereof from the infeed conveyor 82, to raise the sheet B into a position in which it is well-suited to receive a layer of articles from the slide plate assembly 50, to index upwardly and downwardly with the deposition of each layer of articles, and to convey a complete stack of articles onto the outfeed conveyor 86. Toward these ends, the hoist 84 has a support bed 200, is mounted on the frame 36 for vertical movement with respect thereto by a lift chain assembly 202, and has a drive assembly 204 that is configured to optimize indexing.

Referring now to FIGS. 3–5, 13, and 16–20, the lift chain assembly 202 includes four lift chains—two at each longitudinal end of the hoist 84 composing a set. Each set of lift chains is raised and lowered by operation of a respective drive shaft 206, 208 and an associated drive sprocket 210, 212. Both drive shafts 206 and 208 are driven to rotate by right-angle gear boxes which in turn are driven by a common main drive shaft 218. The main drive shaft 218 is driven by a hoist lift motor 220 via a drive belt 222. Hoist lift motor 220 comprises a variable speed electric motor 220 controlled as detailed below.

The support bed 200 includes a carriage that is mounted on the lift chain assembly 204 via a frame 224. Specifically, each corner of the frame 224 is attached to a respective chain of the assembly 204, and the carriage 226 is mounted on the frame 224 by spaced guide rods 228. The carriage 226 supports a plurality of spaced drive rollers 230 that are driven to rotate by an electric motor 232 mounted on carriage 226 beneath the rollers 230. Torque is transferred to the rollers 230 by a conventional chain arrangement consisting of a master chain and a plurality of slave chains.

Operation of the lift motor 220 is coordinated with operation of the slide plate assembly 50 to achieve the indexing and article flattening operations. A preferred arrangement for effecting this control will now be detailed.

Figure 14:
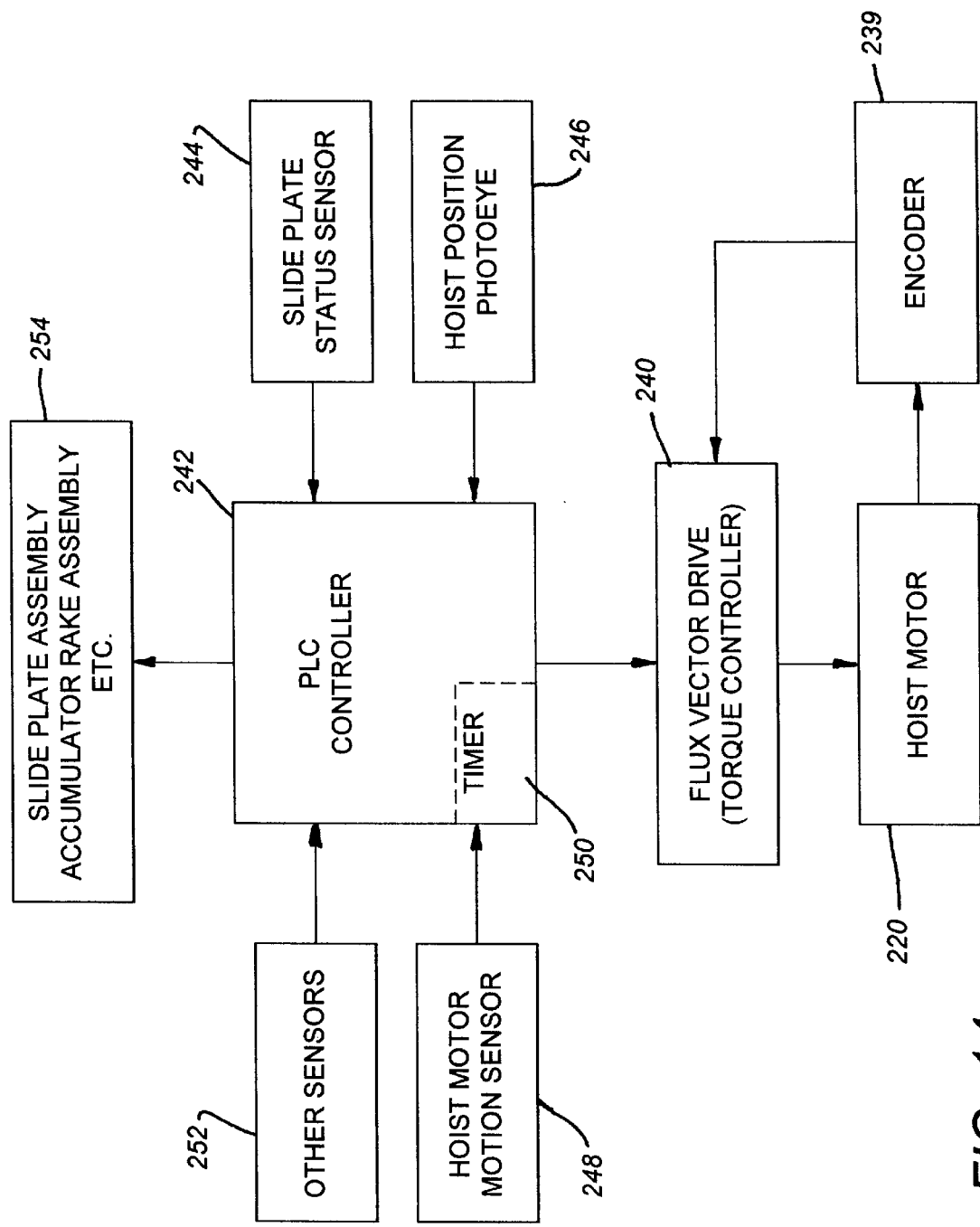
FIG. 14 is a schematic diagram of the controls for the lift motor of the hoist of FIG. 13.

Referring to FIG. 14, hoist lift motor control is effected by way of a flux vector drive 240 or other torque controller that supplies a designated current to the hoist lift motor 220 upon demand to cause the motor 220 to generate a desired torque. The timing and magnitude of the torque to be generated are determined by a PLC controller 242 or the like based on inputs from sensors. These sensors include a slide plate status sensor 244 in the form of a limit switch or electric eye, a hoist lift motor motion sensor 248 that preferably takes the form of an encoder 239, and a hoist position sensor 246 that preferably takes the form of an electric eye or photoeye located beneath the slide plate assembly 50. A timer 250 and possibly other devices such as a counter (not shown) are programmed into the PLC controller 242 to aid in indexing operations as detailed below. The PLC controller 242 also receives signals from other sensors (such as limit switches indicating the presence or absence of a layer of articles on the slide plate assembly 50) to transmit output signals to the drive motor 152 for the slide plate assembly 50, the drive motor 70 for the rake assembly 46, or to other components as designated by the block 254 in FIG. 14.

Figure 15:
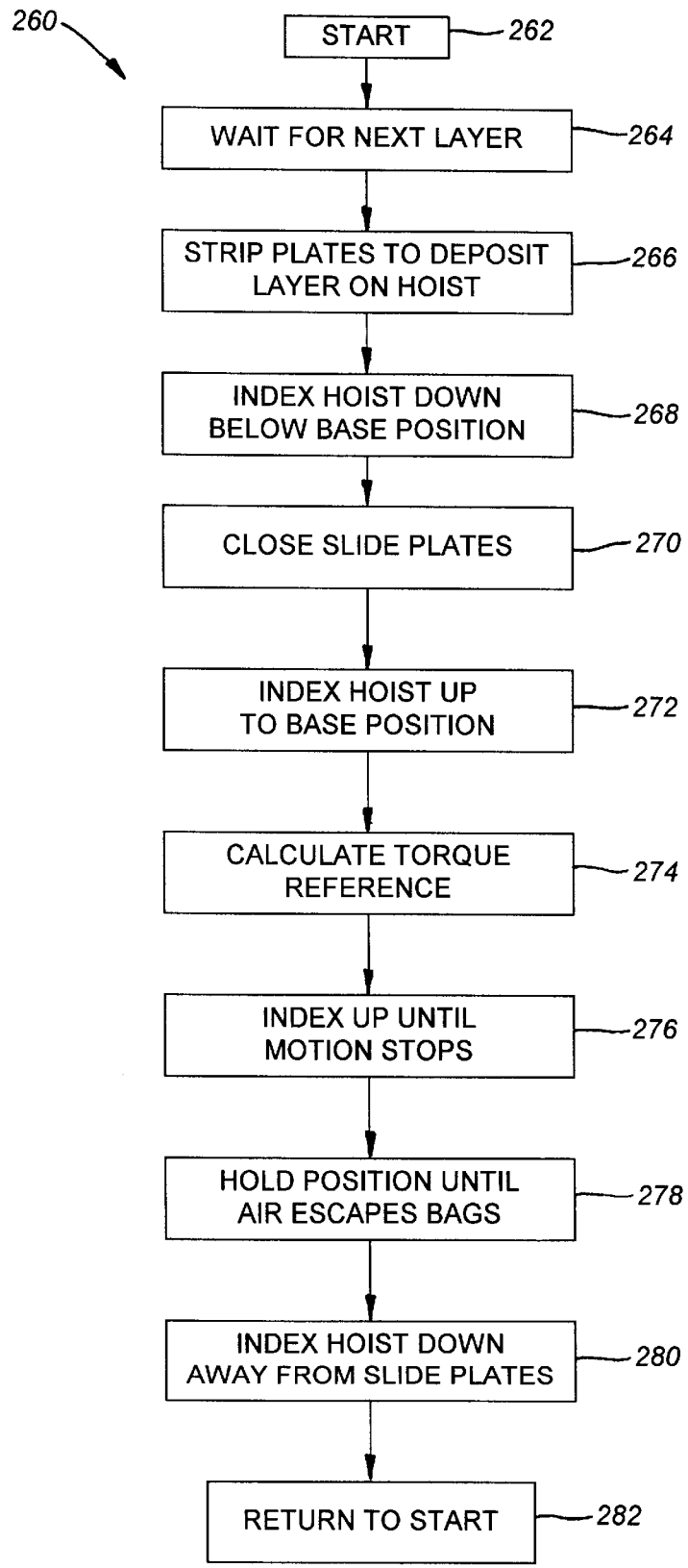
FIG. 15 is a flowchart of the operation of the torque controller for the lift motor of the hoist of FIG. 13.
Figure 16:
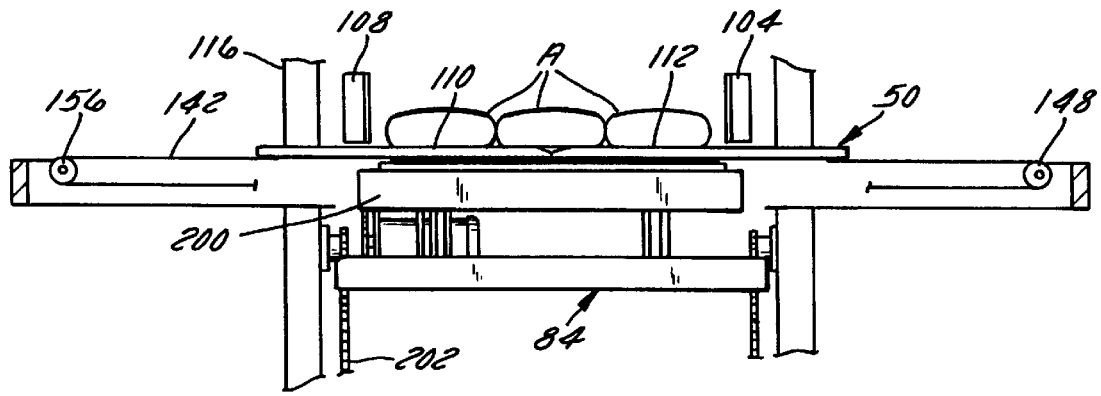
FIGS. 16 through 20 are partially-schematic end elevation views illustrating the sequence of depositing layers of articles onto the hoist from the slide plate assembly and of indexing the hoist to and from a bag compressing position.
Figure 17:
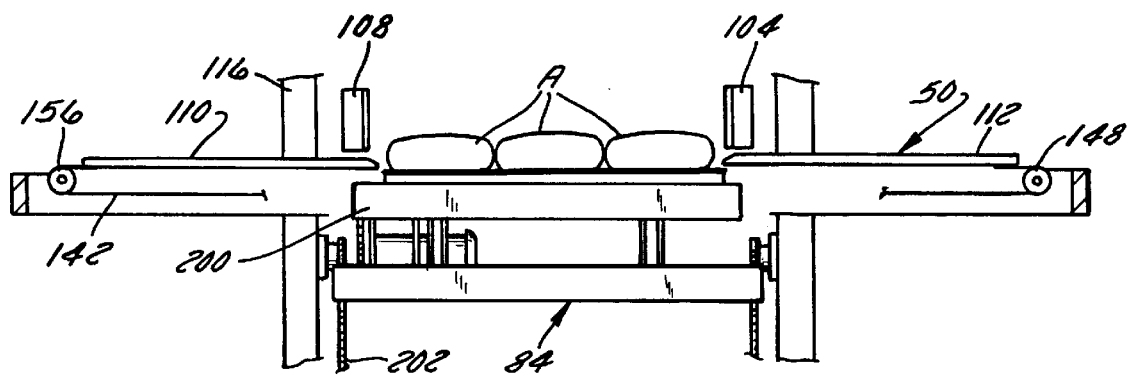
Figure 18:
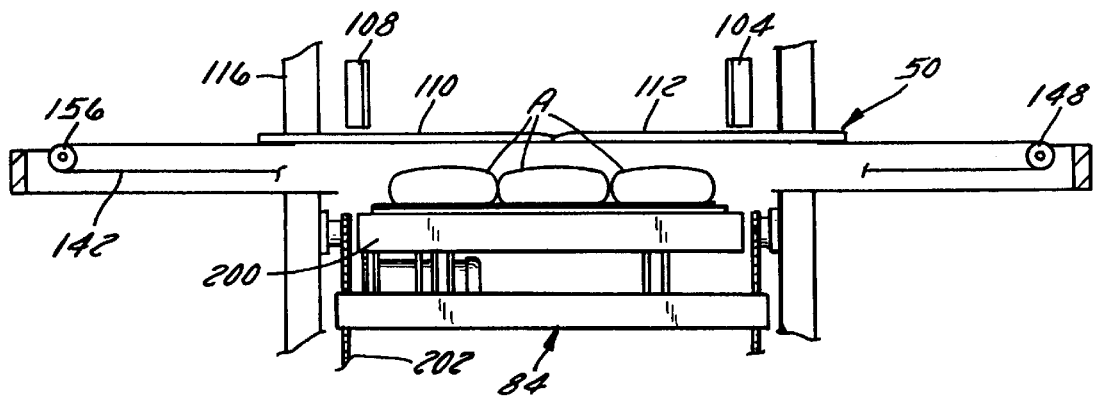
Figure 19:
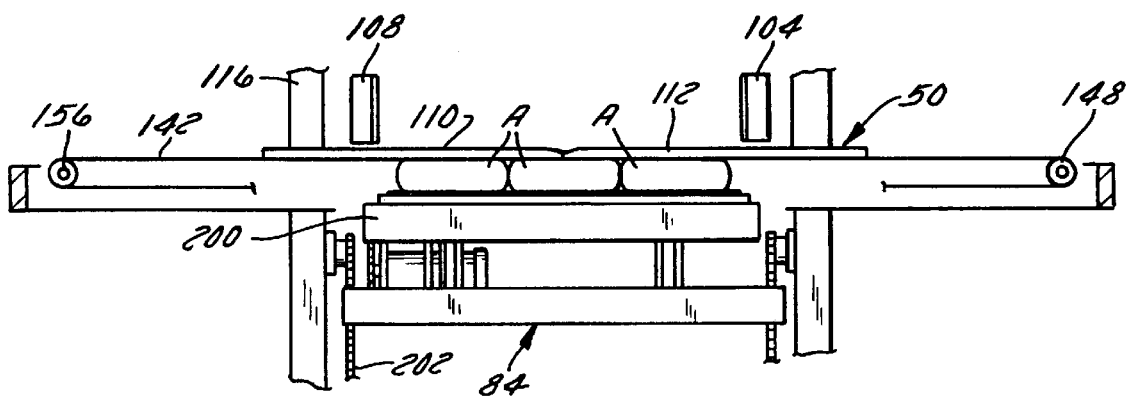
Figure 20:
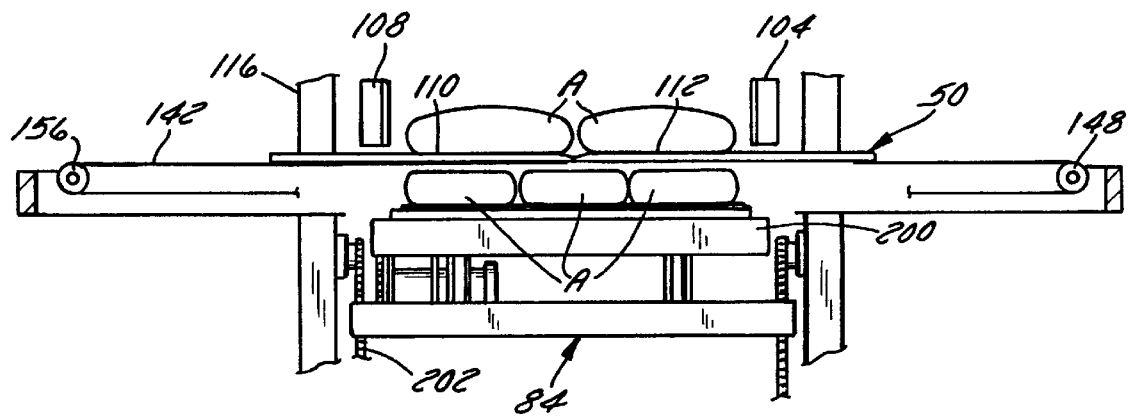

Referring now simultaneously to the flowchart 260 of FIG. 15 and to the schematic drawings of FIGS. 16–20, stacking of layers of articles on the hoist 84 proceeds from START at block 262 of FIG. 15 to block 264 in which the system waits for the next layer of articles to be raked onto the closed slide plates 110 and 112 as seen in FIG. 16. When the sensor 244 determines that a layer of articles is positioned on the slide plate assembly 50 and is ready to be deposited on the hoist 84, the PLC controller 242 energizes the motor 152 to drive the slide plates 110 and 112 away from one another to deposit the layer of articles on the hoist 84 as represented by the block 266 in FIG. 15 and as seen in FIG. 17. The PLC controller 242 then drives the hoist lift motor 220 in reverse to lower the hoist 84 to a position in which the upper surface of the layer is driven downwardly to a base position as detected by the photoeye 246 as represented by the block 268 in FIG. 15 and as seen in FIG. 18. This base position is located far enough beneath the slide plate assembly 50 to permit the slide plate assembly 50 to open and close without interference from the hoist 84 or a stack of articles supported thereon. The slide plates 110 and 112 are also closed as seen in block 270.

Next, in block 272, the PLC controller 242 transmits a signal to the flux vector drive 240 to index the hoist 84 upwardly through an indexing stroke the height of which is equivalent to the thickness of the layer. The torque generated by the motor 220 during this indexing is calculated in block 274 so that the upward motion of the hoist 84 stops at block 276 when the hoist obtains the position seen in FIG. 19 in which the upper layer of articles is compressed against the underside of the lift plate assembly 50 with a force that is sufficiently high to flatten the articles and to force air out of them but which is sufficiently low that there is no danger of article rupture or motor overload. The preferred technique for calculating this torque is 1) by multiplying the number of layers of articles on the hoist 84 (counted by the internal counter of the PLC controller 242 during the previous downward cycle of the hoist 84) by a fixed torque multiplier to obtain an indexing torque and 2) by adding the indexing torque to a reference torque to obtain the designated or optimal torque required to lift the hoist 84 into its compressing position. Alternatively, a look-up table could be employed which stores torque values as a function of the number of layers on the hoist 84. These torque values could be determined empirically prior to the palletizing operation. The addition of the indexing torque to the reference torque causes the torque to increase stepwise with the number of layers of articles supported on the hoist 84. The values of the reference torque and the torque multiplier are empirically derived. The reference torque is dependent upon the torque required to lift the weight of the unloaded hoist. The torque multiplier is dependent upon the weight of each layer of articles and will vary with the weights of the articles being stacked.

In block 248, the hoist 84 is maintained in its raised, compressing position for a period of time calculated to assure that the air is forced from the bags or other articles. This period (typically from approximately one half second to approximately one second) is preset by the timer 250 which preferably is manually setable to the desired value. At the end of this period, the PLC controller 242 transmits a signal to the vector drive 240 to reverse the hoist lift motor 220 to index the hoist 84 downwardly away from the slide plates 110 and 112 and back to the base position as seen in block 280 and in FIG. 15. Between the time the hoist 84 indexes downwardly to its base position and returns to its compressing position, the slide plates 110 and 112 close to be ready for receiving the next layer of articles. The routine 260 then returns to START at block 282, and the process is repeated on a layer-by-layer basis until the PLC's internal counter (not shown) determines that a stack is fully formed on the hoist 84. The hoist 84 is then lowered to its bottom-most position, and the motor 232 is energized to drive the rollers 230 to convey the loaded stack onto the outfeed conveyor 86. The stack is then conveyed away from the palletizer 30 by the outfeed conveyor 86.

Many changes and modifications could be made to the invention as described without departing from the spirit thereof. The scope of some of these changes are discussed above. The scope of other changes will become apparent from the appended claims.

We claim:

1. An article handling system comprising:
   (A) an article conveyor assembly having an infeed end and a discharge end;
   (B) a slide plate assembly disposed so as to receive articles from said article conveyor assembly, said slide plate assembly including first and second slide plates which are positioned adjacent said discharge end of said article conveyor assembly, said slide plates facing one another and movable laterally with respect to a direction of conveyance of said article conveyor assembly (1) from a first position in which said slide plates are located closely adjacent to each other so as to be capable of supporting a layer of articles (2) to a second position in which said slide plates are spaced from one another to form an opening through which the layer of articles may drop; and
   (C) an air-assist assembly for directing air upwardly through said slide plates so as to form an air cushion that reduces friction between the layer of articles and said slide plates, wherein said air-assist assembly cyclically reduces the flow of air through said slide plates so that increasing friction between incoming articles and said first and second slide plates acts as a brake which inhibits articles from bunching up against a downstream end of said slide plate assembly.

2. An article handling system as defined in claim 1, wherein said slide plate assembly further comprises stationary support rails extending laterally with respect to the direction of conveyance of said article conveyor assembly, and wherein each of said slide plates comprises first and second sets of slide plate supports, each of which is associated with one of said rails, each of said sets including at least one lower support positioned beneath the associated rail and at least one upper support positioned above the associated rail such that the associated rail is positioned between the upper and lower supports to constrain said slide plate from moving either upwardly or downwardly with respect to the associated rail.

3. An article handling system as defined in claim 2, wherein said slide plate supports comprise blocks formed from a low-friction material.

4. An article handling system as defined in claim 1, wherein said article conveyor assembly includes
   an accumulator section which is located adjacent said slide plate assembly and on which the layer of articles is formed, and
   a rake assembly which is operable to transfer the layer of articles from said accumulator section to said slide plate assembly.

5. An article handling system comprising:
   (A) an article conveyor assembly having an infeed end and a discharge end;
   (B) a slide plate assembly disposed so as to receive articles from said article conveyor assembly, said slide plate assembly including first and second slide plates which are positioned adjacent said discharge end of said article conveyor assembly, said slide plates facing one another and movable laterally with respect to a direction of conveyance of said article conveyor assembly (1) from a first position in which said slide plates are located closely adjacent to each other so as to be capable of supporting a layer of articles (2) to a second position in which said slide plates are spaced from one another to form an opening through which the layer of articles may drop, wherein each of said slide plates comprises a top plate having perforations formed therethrough and a bottom plate disposed beneath said top plate to define a chamber therebetween, and a plurality of spacers disposed between said top plate and said bottom plate and which maintain a uniform spacing between said top plate and said bottom plate, wherein each of said spacers comprises a tubular bushing welded to said bottom plate and attached to said top plate by a flathead screw which extends through said top plate and which is threaded into a tapped bore in said bushing; and (C) an air-assist assembly for directing air upwardly through said slide plates so as to form an air cushion that reduces friction between the layer of articles and said slide plates, wherein said air-assist assembly comprises a blower and hoses which conduct air from said blower to said chambers of said slide plates whereby air flows upwardly through said perforations in said top plates to form an air cushion that reduces friction between said layer of articles and said slide plates.

6. An article handling system as defined in claim 5, wherein said blower comprises a variable speed blower.

7. An article handling system comprising:

(A) an article conveyor assembly having an infeed end and a discharge end;

(B) a slide plate assembly disposed so as to receive articles from said article conveyor assembly, said slide plate assembly including first and second slide plates which are positioned adjacent said discharge end of said article conveyor assembly, said slide plates facing one another and movable laterally with respect to a direction of conveyance of said article conveyor assembly (1) from a first position in which said slide plates are located closely adjacent to each other so as to be capable of supporting a layer of articles (2) to a second position in which said slide plates are spaced from one another to form an opening through which the layer of articles may drop;

(C) an air-assist assembly for directing air upwardly through said slide plates so as to form an air cushion that reduces friction between the layer of articles and said slide plates; and (D) a vertically movable hoist assembly which is located beneath said slide plate assembly and which receives layers of articles from said slide plate assembly, said hoist assembly including
a support bed,
a drive assembly which drives said support bed to move vertically between 1) an article receiving position in which said support bed receives layers of articles from said slide plate assembly and 2) a compressing position in which an upper layer of articles on said support bed is compressed against a bottom surface of said slide plate assembly to flatten said upper layer of articles, and
an indexing mechanism which controls said drive assembly to impose a designated torque on said support bed when said support bed is raised from said article receiving position to said compressing position, wherein said designated torque increases stepwise with the number of layers of articles supported on said support bed so that a uniform compressive force is imposed on each layer of articles by said bottom surface of said slide plate assembly.

8. An article handling system as defined in claim 7, wherein said drive assembly is additionally operable to move said hoist vertically between said article receiving position and an infeed/outfeed position located beneath said article receiving position, and further comprising a staging mechanism and outfeed conveyor both of which are located in substantially the same plane as said infeed/outfeed position, wherein said staging mechanism is located upstream of said hoist assembly and conveys article supports one at a time onto said support bed, and wherein said outfeed conveyor is located downstream from said hoist assembly and conveys stacks of articles away from said hoist assembly.

9. An article handling system as defined in claim 8, wherein said staging mechanism comprises a conveyor which selectively conveys a support sheet onto said support bed, and wherein said support bed includes a powered roller conveyor on which the support sheet rests.

10. A slide plate assembly capable of receiving articles from an article conveyor assembly, said slide plate assembly comprising:

(A) a stationary frame;

(B) first and second rails supported on said stationary frame;

(C) a slide plate which is slidably supported on said rails and which is movable (1) from a first position in which said slide plate is capable of supporting a at least a portion of a layer of articles (2) to a second, moved position in which an opening is formed through which the layer of articles may drop, wherein said slide plate includes a perforated plate on which the layer of articles may rest; and (D) means for supplying air upwardly through said perforated plate to form an air cushion that reduces friction between said layer of articles and said perforated plate, wherein operation of said means for supplying is coordinated with article conveyance such that the flow of air through said perforated plate is reduced as a layer of articles moves across said slide plate assembly so that increasing friction between incoming articles and said perforated plate acts as a brake which inhibits articles from bunching up against a downstream end of said slide plate assembly.

11. A slide plate assembly capable of receiving articles from an article conveyor assembly, said slide plate assembly comprising:

(A) a stationary frame;

(B) first and second rails supported on said stationary frame;

(C) first and second slide plates which face one another, which are slidably supported on said rails, and which are movable laterally with respect to said direction of conveyance of said article conveyor assembly (1) from a first position in which said slide plates are located closely adjacent to each other so as to be capable of supporting a layer of articles (2) to a second position in which said slide plates are spaced from one another to form an opening through which the layer of articles may drop, wherein each of said slide plates comprises (1) a top plate having perforations formed therethrough, (2) a bottom plate disposed beneath said top plate to define a chamber therebetween, (3) first and second laterally opposed, longitudinally extending side bars connecting said top plate to said bottom plate, (4) first and second sets of slide plate support blocks mounted on said first and second side bars, respectively, each of said sets being associated with one of said rails, each said set including at least one lower support block positioned beneath the associated rail and at least one upper support block positioned above the associated rail such that the associated rail is positioned between the upper and lower support blocks to constrain said slide plate from moving either upwardly or downwardly with respect to the associated rail; and (D) an air assist assembly including a variable speed blower and hoses which conduct air from said blower to said chambers of said slide plates whereby air flows upwardly through said perforations in said top plates to form an air cushion that reduces friction between said layer of articles and said slide plates, wherein operation of said air assist assembly is coordinated with article conveyance such that the flow of air through said perforated plate is reduced as a layer of articles moves across said slide plate assembly so that increasing friction between incoming articles and said perforated plate acts as a brake which inhibits articles from bunching up against a downstream end of said slide plate assembly.

12. A hoist assembly positionable beneath a slide plate assembly, said hoist assembly comprising:

(A) a stationary hoist frame;

(B) a support bed mounted on said hoist frame for vertical movement thereon;

(C) a drive assembly which drives said support bed to move vertically upwardly between (1) an article receiving position in which said support bed receives layers of articles from said slide plate assembly and (2) a compressing position in which an upper layer of articles on said support bed is compressed against a bottom surface of said slide plate assembly to flatten said upper layer of articles; and (D) an indexing mechanism which controls said drive assembly to impose a designated torque on said support bed when said support bed is raised from said article receiving position to said compressing position, wherein said designated torque increases stepwise with the number of layers of articles supported on said support bed so that a uniform compressive force is imposed on each layer of articles by said bottom surface of said slide plate assembly.

13. A hoist assembly as defined in claim 12, wherein said drive assembly comprises an electric motor and said indexing mechanism comprises a motor controller which supplies electrical power to said electric motor, said motor controller including means for counting a number of layers of articles supported on said support bed, means, coupled to said means for counting, for determining an optimal amount of torque required to be generated by said electric motor to impose said uniform compressive force, said means for determining multiplying a signal indicative of a torque multiplier by a counted number of layers of articles and adding the results to a signal indicative of a reference torque, and means, coupled to said means for determining and to said electric motor, for causing said electric motor to generate said optimal amount of torque.

14. A method comprising:

(A) positioning a support surface of a hoist beneath a slide plate assembly; then (B) opening said slide plate assembly to deposit a layer of articles on said support surface; then (C) closing said slide plate assembly; and then (D) raising said hoist to a compressing position in which said layer of articles engages and is compressed against a bottom surface of said slide plate assembly with a designated compressive force, said raising step comprising generating a predesignated torque using a drive assembly for said hoist, wherein the magnitude of said predesignated torque is determined following said step (B) and before the end of said step (D).

15. A method as defined in claim 14, wherein the step of generating a predesignated torque comprises supplying a current to an electric motor of said drive assembly from a drive controller.

16. A method as defined in claim 15, further comprising calculating said predesignated torque by 1) counting the number of layers of articles on said hoist, 2) multiplying the counted number of layers by a fixed torque multiplier to obtain an indexing torque, and 3) adding the indexing torque to a reference torque to obtain said predesignated torque.

17. A method as defined in claim 14, further comprising, following said step (D), holding said hoist in said compressing position for a designated period of time, then lowering said hoist to a position in which an upper surface of said layer of articles is positioned beneath said bottom surface of said slide plate assembly, closing said slide plate assembly and placing another layer of articles on said slide plate assembly, then opening said slide plate assembly to deposit said another layer of articles on top of said upper surface of said layer of articles, then closing said slide plate assembly, and then raising said hoist to a compressing position in which said another layer of articles engages and is compressed against a bottom surface of said slide plate with said designated compressive force.

18. A method as defined in claim 14, further comprising lowering said hoist following said step (C) and prior to said step (D).

19. A method comprising:

(A) positioning a support surface of a hoist beneath a slide plate assembly; then (B) opening said slide plate assembly to deposit a layer of articles on said support surface; then (C) energizing an electric motor to lower said hoist to a position in which an upper surface of said layer of articles is positioned beneath a bottom surface of said slide plate assembly, then (D) calculating a first designated torque required to be generated by said motor to cause said motor to lift said hoist to a compressing position in which an upper surface of said layer of articles engages, and is compressed against, a bottom surface of said slide plate with a designated compressive force, the calculating step including (1) counting the number of layers of articles on said hoist, (2) multiplying the counted number of layers by a fixed torque multiplier to obtain an indexing torque, and (3) adding the indexing torque to a reference torque to obtain said first designated torque;

(E) closing said slide plate assembly and placing another layer of articles on said slide plate assembly;

(F) generating said designated torque by said motor to lift said hoist into said compressive position thereby to compress said upper surface of said layer of articles against said bottom surface of said slide plates with said designated compressive force; then (G) lowering said hoist to a position in which said upper surface of said layer of articles is spaced vertically beneath said slide plate assembly; then (H) opening said slide plate assembly to deposit said another layer of articles on top of said upper surface of said layer of articles, then (I) lowering said hoist to a position in which an upper surface of said another layer of articles is spaced vertically from said bottom surface of said slide plate assembly; then (J) closing said slide plate assembly;

(K) calculating a second designated torque required to be generated by said motor to cause said motor to lift said hoist to a second compressing position in which said another layer of articles engages and is compressed against said bottom surface of said slide plate with said designated compressive force, the calculating step including
  (1) counting the number of layers of articles on said hoist,
  (2) multiplying the counted number of layers by said fixed torque multiplier to obtain a second indexing torque, and
  (3) adding the second indexing torque to said reference torque to obtain said second designated torque; and (L) generating said second designated torque by said motor to raise said hoist to said second compressing position.

20. A method comprising:

(A) conveying a layer of articles onto and across a perforated plate of a plate assembly;

(B) while the layer of articles is moving across said perforated plate, initially supplying air upwardly through said perforated plate to form an air cushion that reduces friction between said layer of articles and said perforated plate, and then reducing airflow through and said enter evenly over perforated plate so that increasing friction between the layer of articles and said perforated plate acts as a brake which inhibits articles from bunching up against a downstream end of said plate assembly.

21. A method as defined in claim 20, wherein said plate assembly is a slide plate assembly, and further comprising stripping said perforated plate from under the layer of articles following said conveying step to permit the layer of articles to fall by gravity onto an underlying hoist.

* * * * *